(12) United States Patent
Noritsugu et al.

(10) Patent No.: US 7,980,622 B2
(45) Date of Patent: Jul. 19, 2011

(54) POWER SUPPLY APPARATUS FOR A SLIDING DOOR

(75) Inventors: Enomoto Noritsugu, Tokyo (JP);
Ushiyama Masatoshi, Tokyo (JP);
Mukai Yasuhiko, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 306 days.

(21) Appl. No.: 12/296,225

(22) PCT Filed: Dec. 7, 2007

(86) PCT No.: PCT/JP2007/073716
§ 371 (c)(1),
(2), (4) Date: Oct. 6, 2008

(87) PCT Pub. No.: WO2008/069321
PCT Pub. Date: Jun. 12, 2008

(65) Prior Publication Data
US 2009/0178340 A1    Jul. 16, 2009

(30) Foreign Application Priority Data
Dec. 8, 2006 (JP) .................. 2006-332209

(51) Int. Cl.
*B60R 16/02* (2006.01)
(52) U.S. Cl. ............. 296/155; 296/146.4; 174/72 A
(58) Field of Classification Search ........... 296/146.4, 296/155, 146.1, 146.9; 174/72 A
See application file for complete search history.

(56) References Cited

U.S. PATENT DOCUMENTS

| | | | | | |
|---|---|---|---|---|---|
| 6,076,883 | A | * | 6/2000 | Labonde et al. | 296/155 |
| 6,161,894 | A | * | 12/2000 | Chapman | 296/155 |
| 6,176,715 | B1 | | 1/2001 | Buescher | |
| 6,323,428 | B1 | | 11/2001 | Takano | |
| 6,386,620 | B1 | * | 5/2002 | Fukumoto et al. | 296/155 |
| 6,682,353 | B2 | * | 1/2004 | Bigotto | 439/34 |
| 6,818,827 | B2 | * | 11/2004 | Kato et al. | 174/72 A |
| 7,086,687 | B2 | * | 8/2006 | Aoki et al. | 296/155 |
| 7,220,129 | B1 | * | 5/2007 | Nishijima et al. | 439/34 |
| 7,252,541 | B2 | * | 8/2007 | Tsubaki et al. | 439/501 |
| 7,284,785 | B2 | * | 10/2007 | Gotou et al. | 296/155 |
| 7,381,897 | B2 | * | 6/2008 | Nishijima et al. | 174/72 A |
| 2003/0164625 | A1 | * | 9/2003 | Dobson | 296/155 |

FOREIGN PATENT DOCUMENTS
EP    0977335 A2    2/2000
(Continued)

OTHER PUBLICATIONS

International Search Report dated Jan. 15, 2008 for PCT Application Serial No. PCT/JP2007/073716, 2 Pages.

(Continued)

*Primary Examiner* — Jason S Morrow
(74) *Attorney, Agent, or Firm* — Turocy & Watson, LLP

(57) ABSTRACT

A power supply apparatus for a sliding door includes a body-side fixture mounted on an automobile body, a door-side fixture mounted on the sliding door, and a flat cable gripped in the body-side fixture and the door-side fixture for supplying power to the sliding door. The flat cable is pulled out from the body-side fixture and/or the door-side fixture to form a convex flexural portion during opening and closing of the sliding door. The flat cable pull-out direction conforms with the protrusion direction of the convex flexural portion.

20 Claims, 7 Drawing Sheets

FOREIGN PATENT DOCUMENTS

| | | |
|---|---|---|
| EP | 0982195 A2 | 3/2000 |
| JP | 11-93514 | 4/1999 |
| JP | 2002-79892 | 3/2002 |
| JP | 2002-154389 A | 5/2002 |
| JP | 2004-34759 | 2/2004 |
| JP | 2004114872 A | 4/2004 |
| JP | 2005-178700 A | 7/2005 |
| JP | 2005238952 A | 9/2005 |
| JP | 2006-15981 A | 1/2006 |
| JP | 2006-21689 A | 1/2006 |
| WO | WO00/73095 A1 | 12/2000 |

OTHER PUBLICATIONS

Extended European Search Report dated Jul. 6, 2010 for European Patent Application No. 07850294.5, 7 pages.

Chinese OA dated Sep. 8, 2010 for Chinese Patent Application No. 200780029980.6, pp. 8 (with English Translation).

* cited by examiner

POWER SUPPLY APPARATUS FOR A SLIDING DOOR

CROSS-REFERENCE TO RELATED APPLICATIONS

This application is a US national stage filing of Patent Cooperation Treaty (PCT) Application Serial No PCT/JP2007/73716 (WO2008/069321), filed Dec. 7, 2007, which claims priority to Japanese Patent Application No. 2006-0332209, filed Dec. 8, 2006, the entirety of which is incorporated herein by reference.

TECHNICAL FIELD

The present invention relates to a power supply apparatus for a sliding door of an automobile, in which the power can be continuously supplied to the equipment disposed inside the sliding door from the automobile body side.

BACKGROUND ART

A sliding door used in a van, a wagon-type car or the like is equipped with an electromechanical devices such as a power window motor, a switch, a speaker and the like, which are assembled inside the sliding door. In order to supply a power to the electromechanical devices, a wiring body (a wire harness) is required to be arranged from the automobile body side to the sliding door and simultaneously the wiring body is required to conform to the opening and closing operation of the sliding door. Conventionally, a round wire having a high flexibility has been used as the wiring body.

Conventionally, this type of power supply apparatus for a sliding door is equipped with a wire-winding section in the automobile body side, and the remaining portion of the wire is wound around the wire-winding section to thereby conform to the opening and closing operation of the sliding door. (See the patent document 1)

As another conventional type of power supply apparatus for a sliding door, a corrugated tube having a wiring body is arranged between a desired position of an automobile body side and a sliding door, such that the corrugated tube has some room for bending. One end of the corrugated tube is fixed to the sliding door and the other end thereof is supported so as to be head-wobbled by means of a harness attached to an automobile body. (See the patent document 2)

As shown in FIG. 11, another type of power supply apparatus for a sliding door uses a plurality of link members 902 connected to each other to form a cable guide 901. A wiring body is arranged from the automobile body 903 to the sliding door 904. (See the patent document 3) The cable guide 901 is arranged to be bent in an S-shape when it is loosened.

Patent Document 1: Japanese Patent Laid-Open Publication Hei No. 11-93514.

Patent Document 2: Japanese Patent Laid-Open Publication No. 2002-79892

Patent Document 3: Japanese Patent Laid-Open Publication No. 2004-34759

TECHNICAL PROBLEM

However, in the conventional power supply apparatus for a sliding door, the wiring body contacts the automobile body or the sliding door during opening and closing of the sliding door, thereby making noises or even damaging the wiring body. In the power supply apparatus for a sliding door disclosed in the patent document 1, the wire is configured to be released from the wire-winding portion in a peeled state, thus the wire is easily damaged by touching other members (a sliding rail and the like). In addition, the wire winding section is required to continuously release or wind a wire having the same length as the opening and closing stroke of the sliding door, thereby leading to a large size apparatus.

In addition, the power supply apparatus for a sliding door disclosed in the patent document 2 is configured such that the wire harness is housed inside a corrugated tube and thus less likely to be damaged. However, the corrugated tube accommodating the wire harness is required to have a length enough to accommodate the opening and closing stroke of the sliding door. In particular, since a round wire is used as the wire harness, the corrugated tube cannot be bent with a small curvature, so that the corrugated tube may contact the automobile body or the sliding door to thereby make noises and damages. In the power supply apparatus for a sliding door disclosed in the patent document 3 in which the wiring body is received in a cable guide, the cable guide tends to contact the automobile body or the sliding door.

Therefore, the present invention has been made to solve the above problems, the object of the present invention is to provide a power supply apparatus for a sliding door, in which a wiring body to supply a power to the sliding door is arranged so as not to contact the automobile body or the sliding door.

TECHNICAL SOLUTION

According to a first embodiment of the invention, there is provided a power supply apparatus for a sliding door comprising: a body-side fixture mounted on an automobile body, a door-side fixture mounted on the sliding door, and a flat cable connected to the body-side fixture and the door-side fixture for supplying a power from the automobile body to the sliding door, the flat cable pull-out direction from the body-side fixture and/or the door-side fixture being conformed with the protrusion direction of the convex flexural portion that is formed during opening and closing of the sliding door.

According to a second embodiment of the invention, an extra length of the flat cable required for the opening and closing operation of the sliding door is bent in the protrusion direction of the convex flexural portion.

According to a third embodiment of the invention, the flexural portion is protrusive approximately in parallel to the lengthwise direction of the automobile body.

According to a fourth embodiment of the invention, the protrusion side of the flexural portion is directed to the rear side of the automobile body.

According to a fifth embodiment of the invention, the protrusion side of the flexural portion is directed toward the front side of the automobile body.

According to a sixth embodiment of the invention, the conductor contained in the flat cable is a rectangular conductor.

According to a seventh embodiment of the invention, the flat cable is contained in a protection member at least between the body-side fixture and the door-side fixture.

According to an eighth embodiment of the invention, the door-side fixture comprises a cable pull-out port, a cable support portion and a cable turning-up portion, and the cable support portion is formed in such a manner that the shape of the flat cable pull-out side thereof is flat-shape in parallel to the lengthwise direction of the automobile body.

According to a ninth embodiment of the invention, the door-side fixture includes a cable pull-out port, a cable support portion and a cable turning-up portion, and the cable support portion is formed in such a way that the cable pull-out side portion thereof is inclined to make the flat cable to be biased toward the automobile body.

According to a tenth embodiment of the invention, when the door-side fixture moves toward the front side of the automobile body, the flexural portion approaches the door-side fixture while being directed toward the front side of the automobile body. When the door-side fixture is moved to the most forward side, the flexural portion moves to the cable turning-up portion and the flat cable is wrapped around the cable turning-up portion.

According to an eleventh embodiment of the invention, when the door-side fixture moves toward the rear side of the automobile body and then moves up to the rearmost thereof, the flat cable becomes approximately straight between the body-side fixture and the door-side fixture, and the flat cable contact with the cable support portion. As the door-side fixture moves toward the front side of the automobile body, the flexural portion is gradually formed.

According to an twelfth embodiment of the invention, the radius of curvature of the cable turning-up portion is set up to be large to the extent that the flat cable is capable of bending.

Effect of the Invention

As described above, according to the present invention, a wiring body for supplying a power to a sliding door employs a flat cable. The flat cable is configured such that it can be pulled out from a body-side fixture and/or a door-side fixture and can be pulled out in at least one direction of front and rear side of the automobile body, thereby forming a flexural portion of the flat cable in the same direction. Therefore, the flat cable can be prevented from touching the automobile body or the sliding door during opening and closing operations of the sliding door.

Figure 1A:
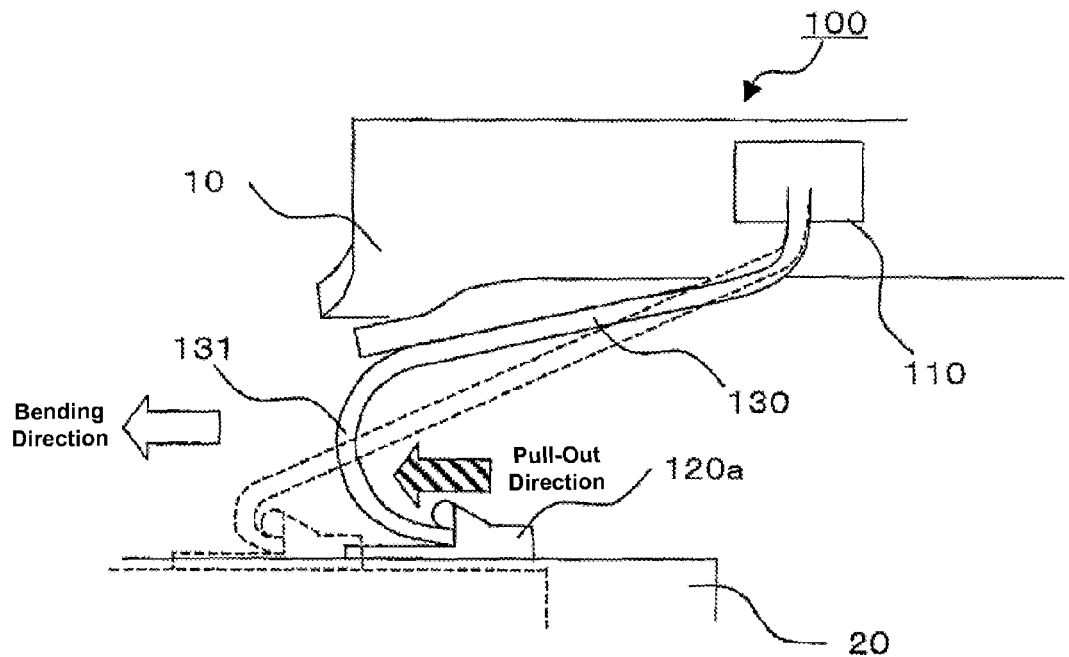
FIG. 1 is a plan view illustrating a power supply apparatus for a sliding door according to a first embodiment of the present invention.

REFERENCE CHARACTERS 10, 30: Automobile body
31: Guide rail
32: Step
33: Guide rail receiver
20, 40: Sliding door
41: Bracket
100, 200, 300, 400, 500: Power supply apparatus for a sliding door
110, 210, 310, 410, 510: Body-side fixture
111: Cable pull-out port
112: Cable support portion
113, 423: Curved portion
120, 220, 320, 420, 520: Door-side fixture
121, 411: Cable pull-out port
122, 412: Cable support portion
123, 413: Cable turning-up portion
130, 230, 330, 430, 530: Flat cable
131, 231, 331, 431: Flexural portion
224: Receiver for extra length
232, 233: Connector
340: Corrugated tube
421: First curved portion
422: Second curved portion
901: Cable guide
902: link member
903: Automobile body
904: Sliding door

BEST MODE FOR INVENTION

Hereinafter, exemplary embodiments of the invention will be explained in details with reference to the accompanying drawings. Like numerals denote like elements for simplifying the explanation and drawings.

Figure 1B:
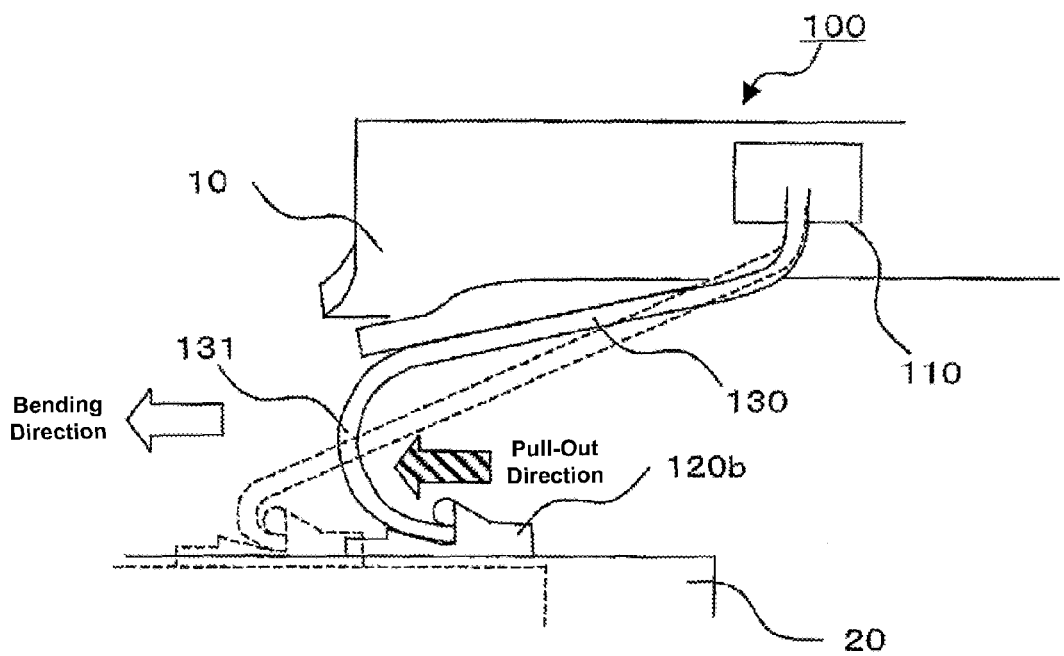

A power supply apparatus for a sliding door according to a first embodiment of the invention is shown in FIG. 1. FIG. 1 illustrates a schematic structure of the power supply apparatus 100 for a sliding door according to the first embodiment of the invention. In this embodiment, the power supply apparatus 100 for the sliding door comprises a body-side fixture 110 fixed on a desired position of an automobile body 10 and a door-side fixture 120 fixed on a desired position of a sliding door 20. A flat cable 130 is disposed between the body-side fixture 110 and the door-side fixture 120.

The power supply apparatus for a sliding door according to the present invention is configured such that the extra length for the opening and the closing operation of the sliding door is bent to a predetermined direction. In order for this flexural portion to be directed to the predetermined direction, the flat cable is configured to be pulled-out in the same direction as the protrusion direction of the flexural portion and fixed with respect to at least one of the body-side fixture or the door-side fixture.

In FIG. 1, the width direction of the figure corresponds to the longitudinal direction of the automobile body 10. Here, the left side of the figure denotes the front side of the automobile body 10, and the sliding door 20 moves toward the front side of the automobile body 10 to close the sliding door. In addition, FIG. 1 shows two different types of the flat cable pull-out portion at the door-side fixture 120.

In this embodiment as shown in FIG. 1, the flexural portion 131 of the flat cable 130 is directed frontward of the automobile body 10 (denoted by the white arrow). The flat cable 130 is pulled out to the front side from the door-side fixture 120 (denoted by a slashed arrow). In this way, the pull-out direction of the flat cable 130 from the door-side fixture 120 (i.e., the flat cable arrangement direction) is configured to conform to the bending direction of the flat cable 130. Thus, the flexural portion 131 can be formed in a desired direction. Due to this arrangement, for example, the flexural portion 131 can be prevented from contacting the automobile body 10 or the sliding door 20 due to bending in a transversal direction of the automobile body 10.

In this embodiment, the pull-out direction of the flat cable 130 from the door-side fixture 120 conforms with the bending direction of the bending portion 131, but not limited thereto. For example, the pull-out direction of the flat cable 130 from the body-side fixture 110 can be configured to conform to the bending direction of the bending portion 131. Alternatively, the pull-out direction of the flat cable 130 from both of the body-side fixture 110 and the door-side fixture 120 may conform to the bending direction of the bending portion 131.

In this embodiment, a wiring body for supplying a power from the automobile body 10 from the sliding door 20 employs a flat cable 130. Preferably, the flat cable 130 contains a rectangular conductor. The rectangular conductor provides a high tensile strength to the plane direction. The flat cable 130 containing such a rectangular conductor is not likely bent in a longer axis direction on the cross-sectional plane thereof.

Therefore, when the longer axis direction on the cross-sectional plane of the flat cable 130 is oriented in vertical direction, the flat cable 130 can be prevented from sagging, due to resistance against the tension by the gravity of the flat cable 130. Thus, when opening or closing the sliding door 20, the flat cable 130 can be moved substantially along the horizontal direction.

On the other hand, the flat cable 130 can be easily bent in a shorter axis direction on the cross-sectional plane thereof. In particular, the flat cable 130 can be bent with a large curvature (small radius of curvature). Thus, as described above, where the flat cable 130 is arranged such that the longer axis direction of the cross-section thereof is vertically oriented, the extra length of the flat cable 130 can be bent in horizontal direction at a small radius of curvature during opening and closing operation of the sliding door 20.

Further, the flexural portion 131 of the flat cable 130 is formed approximately in parallel to the length of the automobile body 10, and thus the flexural portion 131 can be prevented from touching the automobile body 19 or the sliding door 20, during opening and closing of the sliding door 20. In addition, the weight of the flat cable 130 is evenly distributed to the right and left side in the flexural portion 131 thereof, and as the result, the shape of the flexural portion 131 remains in a stable state.

In this way, in order for the flexural portion 131 to be aligned approximately in parallel to the lengthwise direction of the automobile body 10, the direction of the flexural portion 131 is to conform to the pull-out direction of the flat cable 130 from the body-side fixture 110 and/or the door-side fixture 120. In this embodiment, the pull-out direction of the flat cable 130 from the door-side fixture is configured to conform to the direction of the flexural portion 131.

Figure 2A:
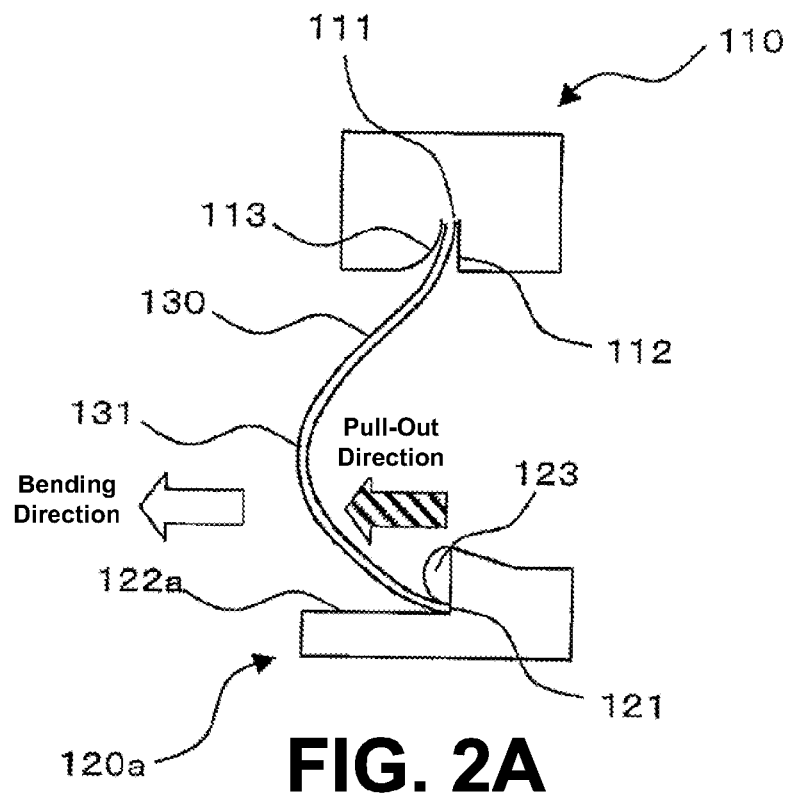
FIG. 2 is a plan view illustration explaining a body-side fixture, a door-side fixture and a flat cable according to the first embodiment of the invention in detail.
Figure 2B:
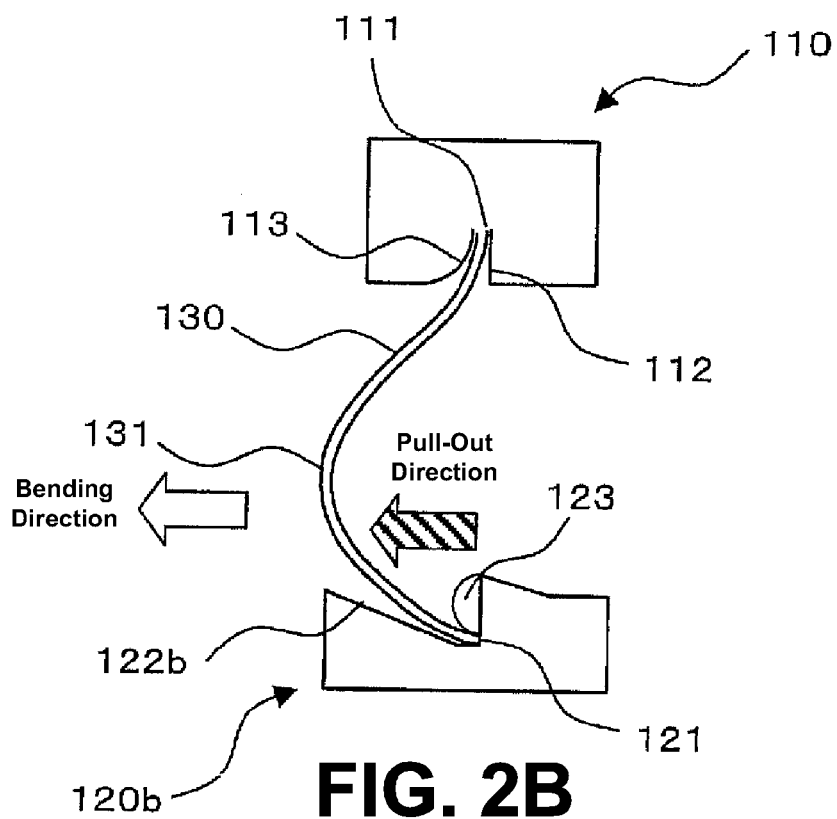

Thereafter, referring to FIG. 2, the structure of the pull-out portion in which the flat cable 130 is pulled-out from the body-side fixture 110 and the door-side fixture 120 will be explained. FIG. 2 schematically illustrates the body-side fixture 110, the door-side fixture 120 and the flat cable 130 in the configuration of FIG. 1. FIG. 2(*a*) shows the structure of a door-side fixture 120 corresponding to FIG. 1(*a*). FIG. 2(*b*) shows the structure of a door-side fixture 120 corresponding to FIG. 2(*a*), too.

The door-side fixture 120*a* as shown in FIGS. 1(*a*) and 2(*a*) is structured in such a way that a cable support portion 122*a* is flat so as to be in parallel to the lengthwise direction of the automobile body 10. In contrast, the door-side fixture 120*b* as shown in FIGS. 1(*b*) and 2(*b*) is structured in a way that the cable support portion 122*b* is inclined towards the automobile body 10 and thus the flat cable 130 is closer to the automobile body 10. Due to such a inclination of the cable support portion 122*b*, when the sliding door 20 is opened and closed, the flexural portion 131 of the flat cable moves frontward in such a manner that the flexural portion crawls up along the inclination of the cable support portion 122*b*, thereby enabling the bending portion 131 of the flat cable to be easily held between the automobile body 10 and the sliding door 20.

First, the pull-out portion, through which the flat cable 130 is pulled out from the door-side fixture 120, comprises a cable pull-out port 121, a cable support portion 122 and a cable turning-up portion 123. The cable pull-out port 121 is structured such that the flat cable 130 can be pulled out towards the front side of the automobile body 10 (the pull-out direction is denoted by the slashed arrow). The flat cable 130 pulled out forwards of the cable pull-out port 121 forms the flexural portion 131 thereof in the forward direction of the automobile body 10 (the protruding direction is denoted by the white arrow) and then is coupled to the body-side fixture 110.

As the door-side fixture 120 moves from the position of FIG. 2 to the dot-line position of FIG. 1, i.e., moves further towards the front side of the automobile body 10 (left side in the figure), the flexural portion 131 approaches the door-side fixture 120 while facing the front side of the automobile body 10. When the door-side fixture 120 reaches the end of traveling path, the flexural portion 131 moves up to the cable turning-up portion 123 and then the flat cable 130 is made to wrap around along the outer peripheral surface of the cable turning-up portion 123. The radius of curvature of the cable turning-up portion 123 is configured to have a radius longer than that the flat cable 130 can be turned-up.

On the other hand, when the door-side fixture 120 moves up to the rearmost position (to the right side in the figure), the flat cable 130 is substantially straight between the body-side fixture 110 and the door-side fixture 120. At this time, since the flat cable 130 face-contacts the cable support portion 122 over the almost entire surface thereof, the flexural portion 131 is not formed. From this state, as the door-side fixture 120 moves forwards, the flexural portion 131 starts to be formed. At this time, however, since the cable support portion 122 supports the flat cable 130, the flexural portion 131 is not biased towards the sliding door 20 (to the lower side in the figure).

The body-side fixture 110 includes a cable pull-out port 111, a cable support portion 112 and a curved portion 113, which are formed where the flat cable 130 is pulled out. In this embodiment, the cable pull-out port 111 is structured such that the flat cable 130 is pulled out in the transversal direction of the automobile body 10 (to the lower side in the figure). However, in order for the flexural portion 131 to be formed forwards of the cable pull-out port 111 (to the left side in the figure), the cable support portion 112 and the curved portion 113 are structured such that the flat cable 130 can be easily protruded towards the front side of the automobile body.

As described, this embodiment is configured such that the flat cable 130 is pulled out forwards of the door-side fixture 120 (denoted by the slashed arrow in FIGS. 1 and 2) and thus the flexural portion 131 can be easily formed forwardly (denoted by the while arrow in FIGS. 1 and 2). In this embodiment, the trace of the flat cable 130 from the time when the sliding door 20 completely is opened to the time when the same is completely closed is illustrated in FIG. 3.

Figure 3:
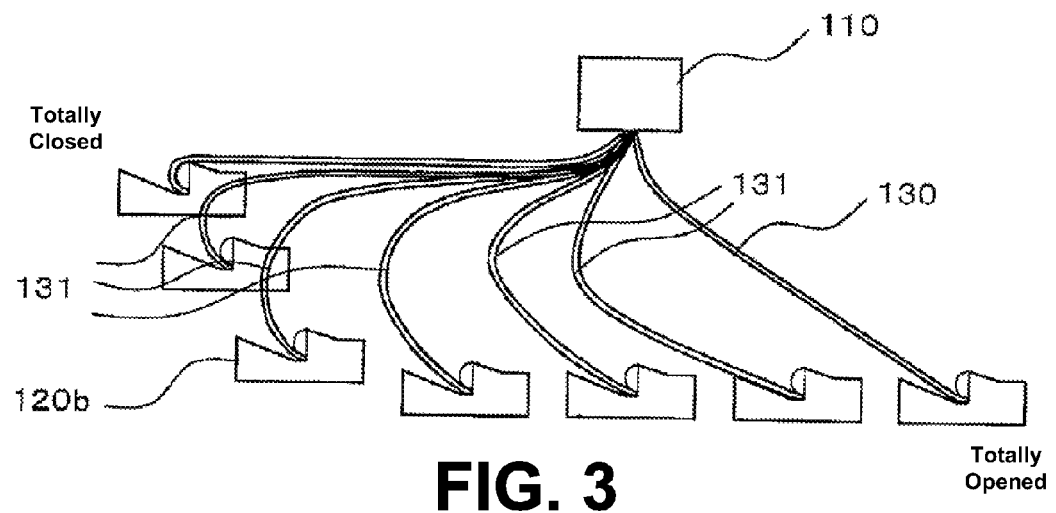
FIG. 3 is a plan view illustrating the traces of the flat cable according to the opening and the closing operation of the sliding door.

FIG. 3 illustrates the case where the door-side fixture 120*b* has the structure as shown in FIGS. 1(*b*) and 2(*b*). In FIG. 3, when the sliding door 20 is completely closed (the left side in the figure), the flat cable 130 does not form a flexural portion 131 because of no substantial extra length of the cable. The flat cable 130 is closest to the automobile body 10 and/or the sliding door 20 when it is completely closed. However, since the flat cable 130 does not have any extra length, the flat cable 130 is not likely to touch the automobile body 10 or the sliding door 20.

As the sliding door 20 is being opened, the flat cable 130 generates an extra length for bending. However, since the flat cable 130 is made to be pulled out forwardly from the door-side fixture 120*b*, the flexural portion 131 is made to be formed forwardly, starting from the cable turning-up portion 123. The flat cable 130 is gripped directed to forward by the door-side fixture 120*b*, and thus the flexural portion 131 is formed and remains forwards to the front side in any case.

As the sliding door 20 approaches a completely open state, the extra length of the flat cable 130 becomes shortened and the flexural portion 131 becomes gradually straight. In addition, when the sliding door 20 completely opens, again the flat cable 130 becomes straight because of no substantial extra length of the cable. During these operations, the flexural portion 131, the automobile body 10 and the sliding door 20 provides enough space in-between, and thus there is no concern that the flat cable 130 touches the automobile body 10 or the sliding door 20.

As described above, in this embodiment, the flat cable 130 is pulled out forward from the door-side fixture 120*b*, and thus the flexural portion 131 is formed forwards always. Therefore, the flexural portion 131 is not biased towards the automobile body 10 or the sliding door 20. As the result, the flexural portion 131 can be prevented from touching the automobile body 10 or the sliding door 20.

Figure 4:
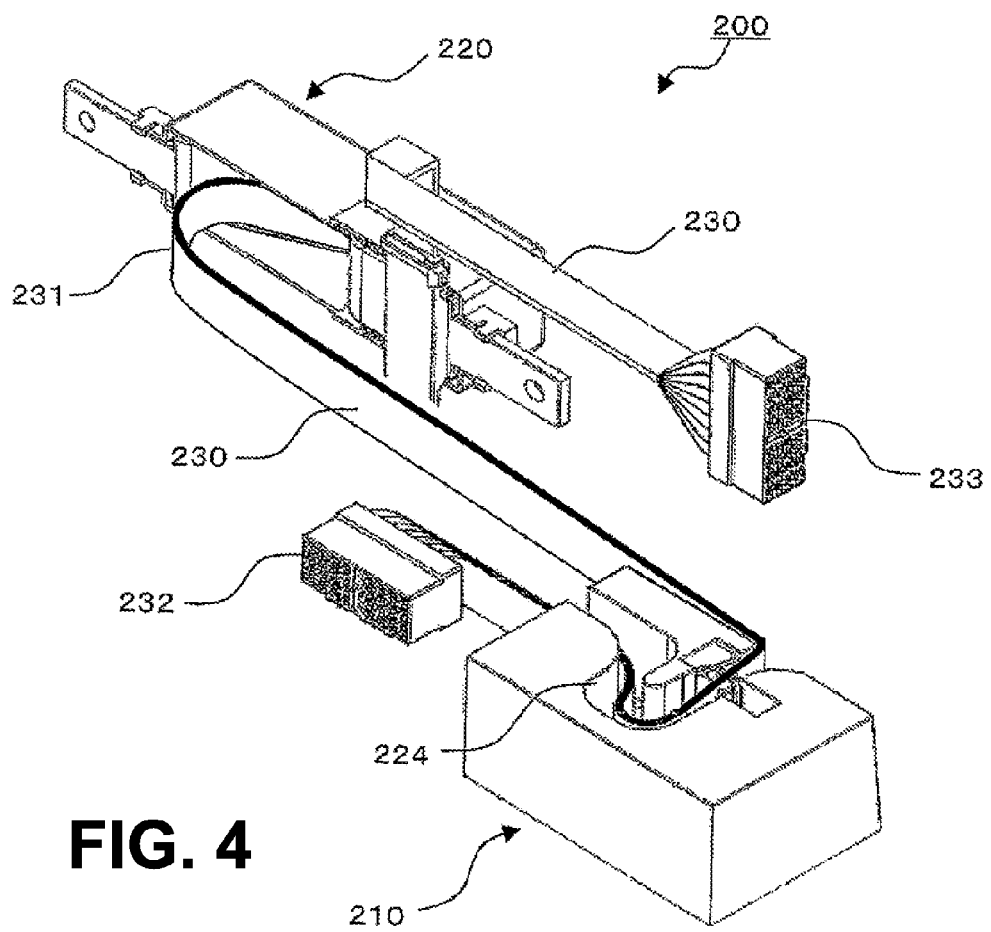
FIG. 4 is a perspective view illustrating a power supply apparatus for a sliding door according to a second embodiment of the invention.

FIG. 4 shows a power supply apparatus for a sliding door according to a second embodiment of the invention. FIG. 4 is a perspective view illustrating the power supply apparatus 200 for a sliding door according to the present embodiment. The power supply apparatus 200 includes a cable bundle 230 formed of a plurality of cables, a connector 232 for coupling the cable bundle 230 to a desired connector on the side of the automobile body 10, and a connector 233 for coupling the cable bundle 230 to a desired connector on the side of the sliding door 20.

The flat cable 230 formed of a plurality of cables bundled together is structured such that the respective cables have different extra lengths in the cable receiver 224 so as not to cause tensile forces of the respective cables in the cable receiver 224. Therefore, in case of the flat cable 230 formed of plural cables, similar to the first embodiment, the flat cable 230 can form a flexural portion 231 in a direction that it is pulled out from the door-side fixture 220, thereby enabling to prevent the flat cable 230 from touching the automobile body 10 or the sliding door 20.

Figure 5:
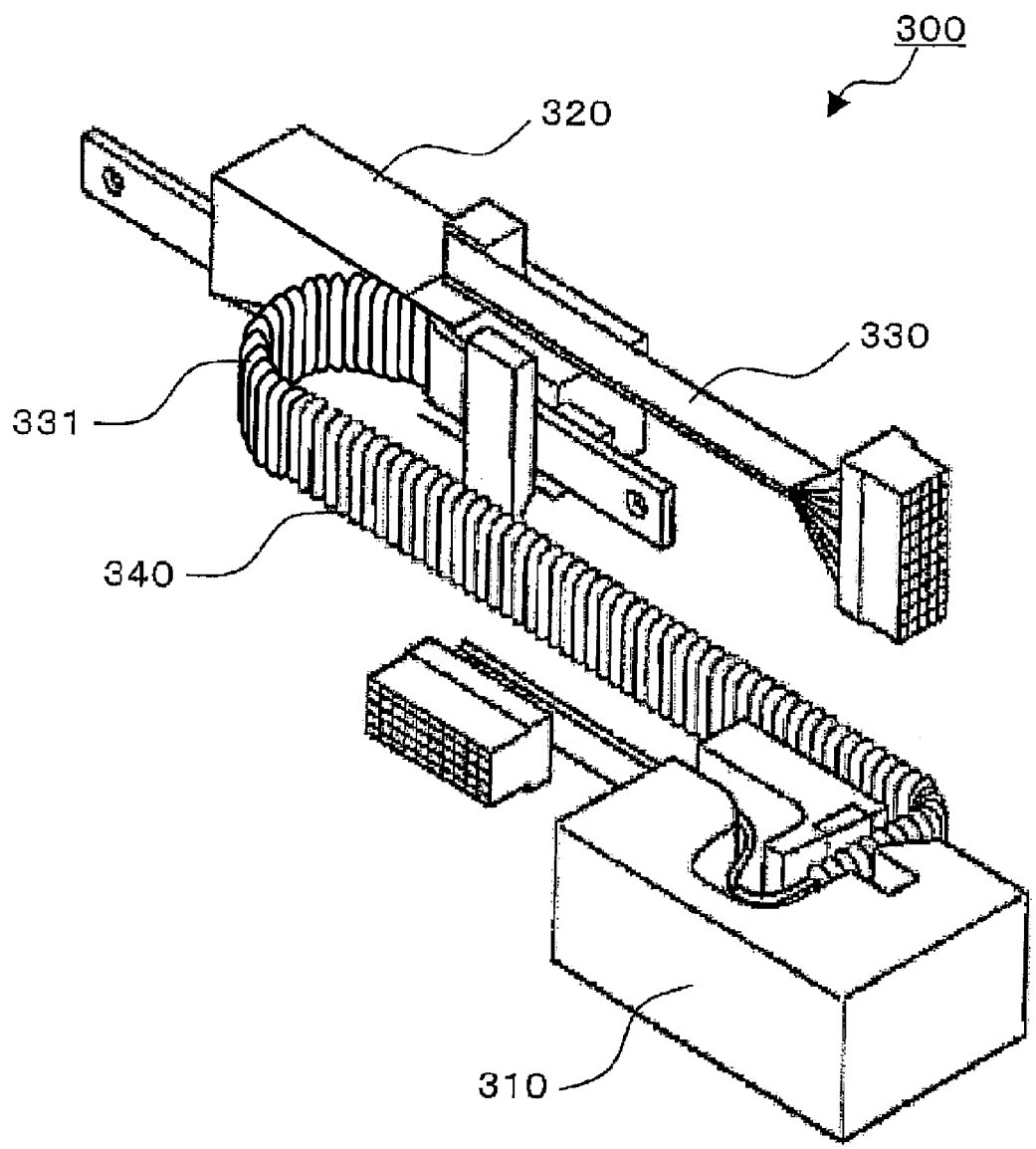
FIG. 5 is a perspective view illustrating a power supply apparatus for a sliding door according to a third embodiment of the invention.

FIG. 5 shows a power supply apparatus for a sliding door according to a third embodiment of the invention. FIG. 5 is a perspective view illustrating the power supply apparatus 300 for a sliding door according to the present embodiment. In the power supply apparatus 300 of this embodiment, the flat cable 330 disposed between the body-side fixture 110 and the door-side fixture 120 is covered with a corrugated tube 340, which is a protection member.

Similar to the flat cable, the corrugated tube 340 has a high flexibility in the shorter axis direction on the cross-sectional plane thereof, and thus can form a flexural portion 331 with a small radius of curvature, along with the contained flat cable 330. On the other hand, the present embodiment employs a corrugated tube 340 as a protection member, but not limited thereto. For example, other types of protection member may be used so long as they have a higher flexibility in the shorter axis direction on the cross-sectional plane thereof.

Similarly, in the embodiment where the flat cable 330 is contained in the corrugated tube 340 serving as a protection member, the flat cable 330 and the corrugated tube 340 together can be pulled out forwards or rearwards from the door-side fixture 320 approximately in parallel to the automobile body 10. Thus, the flexural portion 331 can be formed in the same direction. As the sliding door 20 opens and closes, the flat cable 330 and the corrugated tube 340 moves integrally as illustrated in FIG. 3, thereby enabling to prevent the corrugated tube 340 from contacting the automobile body 10 or the sliding door 20.

Figure 6:
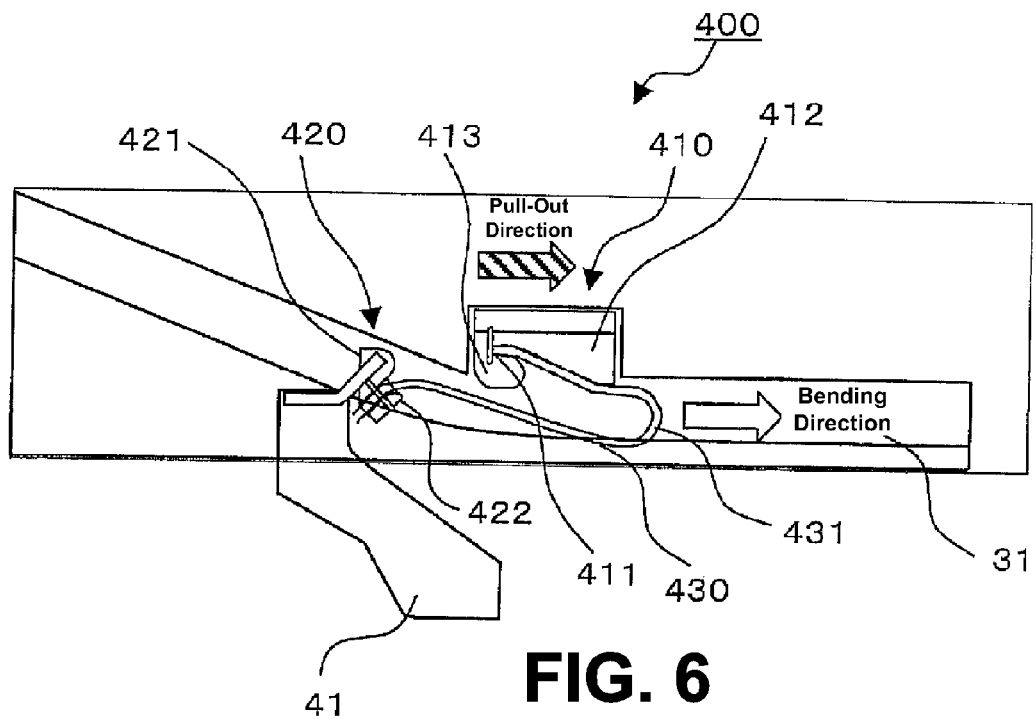
FIG. 6 is a plan view illustrating a power supply apparatus for a sliding door according to a fourth embodiment of the present invention.

FIG. 6 is a plan view illustrating a power supply apparatus for a sliding door according to a fourth embodiment of the invention.

Figure 7:
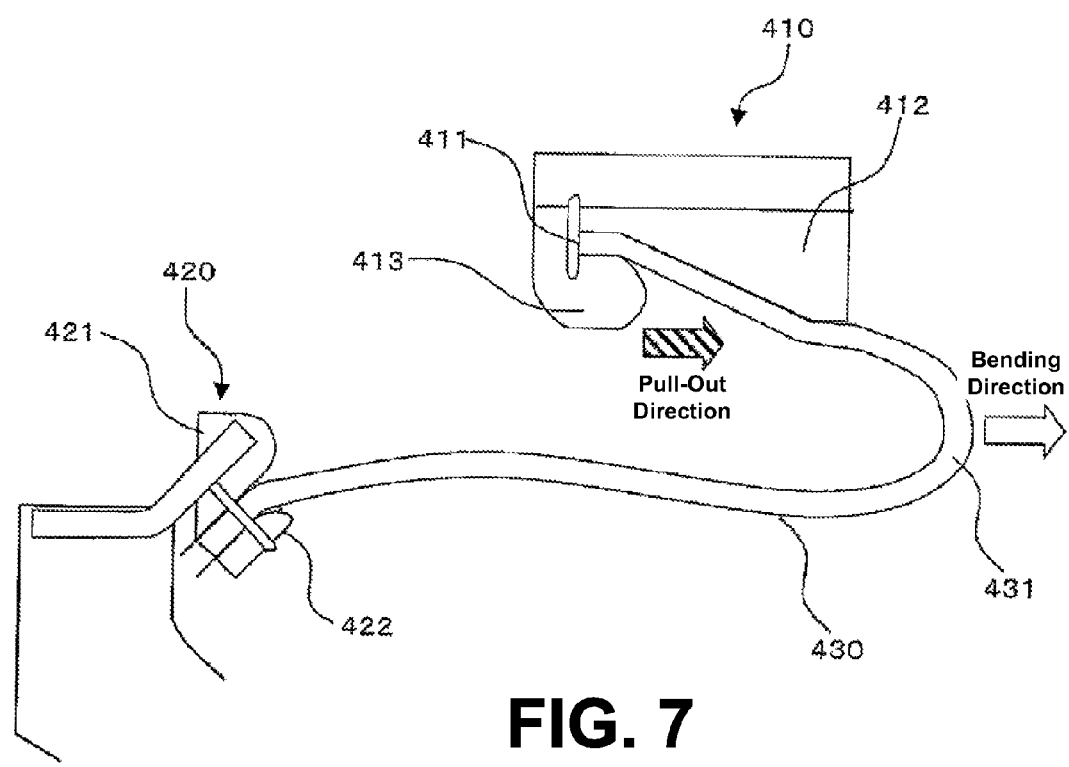
FIG. 7 is a plan view illustration explaining a body-side fixture, a door-side fixture and a flat cable according to the fourth embodiment of the invention in detail.
Figure 8:
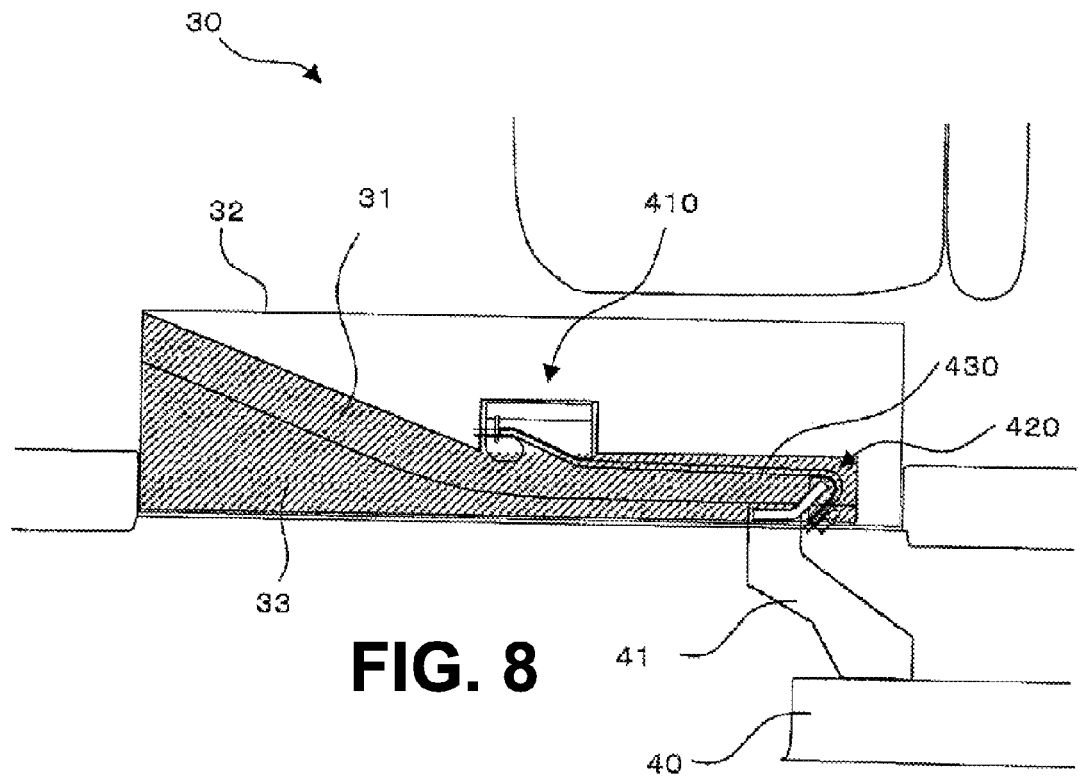
FIG. 8 is a plan view illustrating an automobile structure near a sliding door.

FIG. 7 shows the structures of a body-side fixture 410, a door-side fixture 420 and a pull-out portion of a flat cable 430. The power supply apparatus 400 of this embodiment is applied to automobiles where a sliding door 40 is connected to an automobile body 30 through a bracket 41. FIG. 8 shows an exemplary automobile structure surrounding the sliding door 40. In automobiles where this embodiment can be applied, the sliding door 40 is supported by a bracket 41 mounted at the lower front portion of the sliding door 40, another bracket (not shown) mounted at the upper front portion of the sliding door 40, and a further bracket mounted at the rear side of the sliding door 40.

In the automobile body 30 side, a step 32 is installed at the entrance portion of the sliding door and a guide rail 31 is installed below the step. A guide rail receiver 33 (denoted by a slashed portion in FIG. 8) where the guide rail 31 is installed serves a space for moving a flat cable 430, and simultaneously for passing the bracket 41. A roller (not shown) attached at the body-side leading end of the bracket 41 travels on the guide rail 31 to open or close the sliding door 40. In the power supply apparatus 400 of this embodiment, the flat cable 430, i.e., the wiring body for supplying a power from the automobile body 30 to the sliding door 40 is coupled to the sliding door 40 via the bracket 41.

The guide rail 31 is installed substantially in parallel to the automobile body 30 such that the sliding door 40 can move substantially in parallel to the automobile body 30 until it is closed halfway from the completely open state as shown in FIG. 8. When the sliding door 40 further moves to be completely closed, the sliding door 40 needs to be drawn to the automobile body 30 and thus the guide rail 31 is bent inwards and forwards of the automobile body 30 from around the center portion thereof.

In this embodiment, the power supply apparatus 400 for a sliding door includes a body-side fixture 410 installed in the guide rail receiver 33, a door-side fixture 420 installed in the bracket 41, and a flat cable 430 gripped in the body-side fixture 410 and the door-side fixture 420. The body-side fixture 410 is installed in the inner side of the automobile body 30 than the installation position of the guide rail 31. This is because the body-side fixture 410 is to avoid interference with the bracket 41 traveling on the guide rail 31 and simultaneously the flat cable 430 is to move at the inner side from the installation position of the guide rail 31 as possible as it can.

Further, in connection with the opening and closing direction of the sliding door 40, the body-side fixture 410 is installed almost at the center position of the guide rail 31. In this way, when the sliding door 40 is completely opened and completely closed, the distance between the body-side fixture 410 and the door-side fixture 420 can be substantially equal. As the result, the length of the flat cable 430 from the body-side fixture 410 to the door-side fixture 420 can be made not to be loosened when the sliding door 40 is completely opened or completely closed. When the length of the flat cable 430 is determined in this way, the flat cable 430 can form a flexural portion 431 during opening or closing of the sliding door 40.

In this embodiment, as explained hereafter, the flat cable 430 is prevented from being pushed out from the guide rail receiver 33 and simultaneously from touching the wall face of the guide rail receiver 33 or the sliding door 40, during the opening and closing operation of the sliding door 40.

As illustrated in FIGS. 6 and 7, the flat cable 430 is configured to be pulled out from the body-side fixture 410 towards the rear side of the automobile (in the direction of the slashed arrow). Thus, the flexural portion 431 is formed rearwards of the automobile (in the direction of the white arrow). Similar to the door-side fixture 120 of the first embodiment, the cable pull-out portion where the flat cable 430 is pulled out from the body-side fixture 410 includes a cable pull-out port 411, a cable support portion 412, and a cable turning-up portion 413. The cable pull-out port 411 is formed such that the flat cable 430 is pulled out towards of the rear side of the automobile (in the direction of the slashed arrow). The flat cable 430, which is pulled out from the cable pull-out port 411 towards the rear side of the automobile, forms the flexural portion 431 at the rear side of the automobile (in the direction of the white arrow) and then is coupled to the door-side fixture 420.

On the other hand, as shown in FIG. 6, the door-side fixture 420 installed in the bracket 41 includes a first curved portion 421 and a second curved portion 422. The flat cable 430 is arranged between the first curved portion 421 and the second curved portion 422. In the power supply apparatus 400 of this embodiment, the flat cable 430 is made wrapped around the first curved portion 421 when the sliding door is completely opened, and wrapped around the second curved portion 422 when the sliding door 40 is completely closed.

The power supply apparatus 400 of this embodiment is structured such that the flat cable 430 forms a flexural portion 431 as described above even when it is loosened. Thus, the flat cable 430 is prevented from being pushed out to the outside from the guide rail receiver 33, or from touching the wall face of the guide rail receiver 33.

Figure 9:
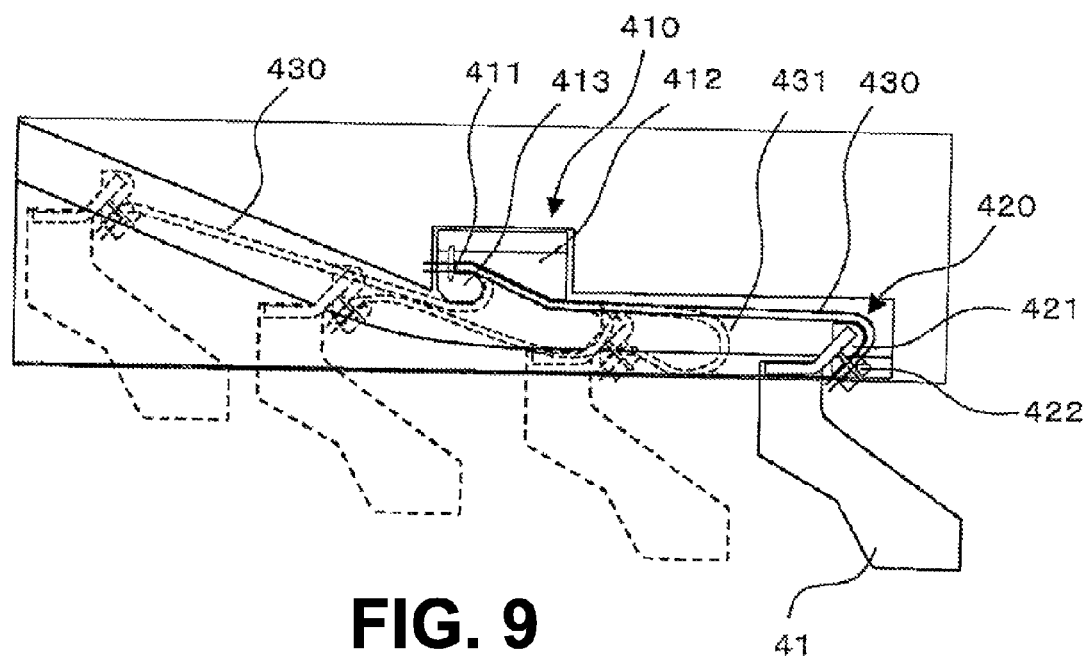
FIG. 9 is a plan view illustrating the traces of the flat cable according to the opening and the closing operation of the sliding door.

FIG. 9 shows the trace of the flat cable 430 when the sliding door 40 moves from the completely closing position to the completely open position thereof. The flat cable 430 is pulled out toward the rear side of the automobile from the cable pull-out port 411. When the sliding door 40 is completely closed, the flat cable 430 is wrapped around the cable turning-up portion 413 and then extended towards the front side of the automobile. At this state, the flat cable 430 has no flexural portion 431 because of no loosening of the flat cable.

Next, as the sliding door 40 is gradually opened, the flat cable 430 starts to form a flexural portion 431 by the extra length thereof. This flexural portion 431 is formed toward the rear side of the automobile from the cable turning-up portion 413 and then gradually moves towards the rear side of the automobile. The extra length of the flat cable 430 becomes longest when the sliding door 40 opens halfway and thus the door-side fixture 420 is closest to the body-side fixture 410. After that, the extra length becomes shorter again. In the meantime, the flexural portion 431 moves slowly toward the rear side of the automobile and remains toward the rear side of the automobile.

When the sliding door 40 is completely open, the extra length of the flat cable 430 becomes disappeared again and the flexural portion 431 contacts the first curved portion 421. As described above, in the power supply apparatus 400 of this embodiment, as the sliding door 40 moves from the completely closed position to the completely open position, the flat cable 430 forms a flexural portion 431 starting from the cable turning-up portion 413 and moves up to the first curved portion 421, with the protrusion of the flexural portion 431 directed to the rear side of the automobile. Due to these features, the flat cable 430 is prevented from being pushed out to the outside from the guide rail receiver 33 or from touching the wall face of the guide rail receiver 33.

In this embodiment, the flat cable 430 is configured in such a way to be pulled out from the body-side fixture 410 toward the rear side of the automobile body 30, but not limited thereto. For example, the flat cable 430 may be made to be pulled out from the door-side fixture 420 toward the rear side of the automobile body. Alternatively, the flat cable 430 may be pulled out from both the body-side fixture 410 and the door-side fixture 420 towards the rear side of the automobile body 30.

Further, the flat cable 430 is arranged between the body-side fixture 410 and the door-side fixture 420, but not limited thereto. Alternatively, the flat cable 430 may be covered with a protection member such as a corrugated tube. It is preferable that this protected member has a higher flexibility in horizontal direction, as in the third embodiment.

Figure 10:
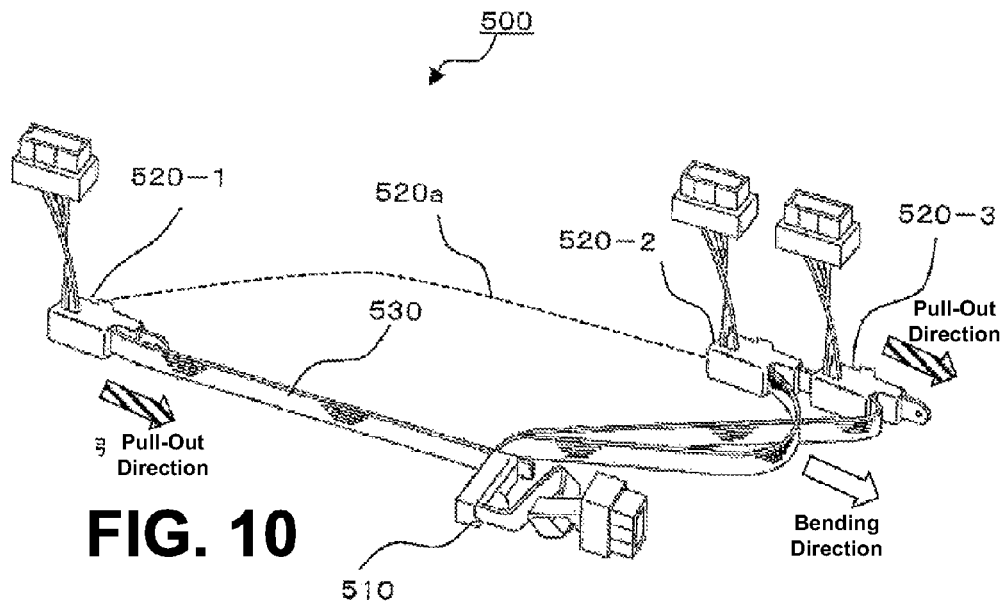
FIG. 10 is a plan view illustrating a power supply apparatus for a sliding door according to a fifth embodiment of the invention.
Figure 11:
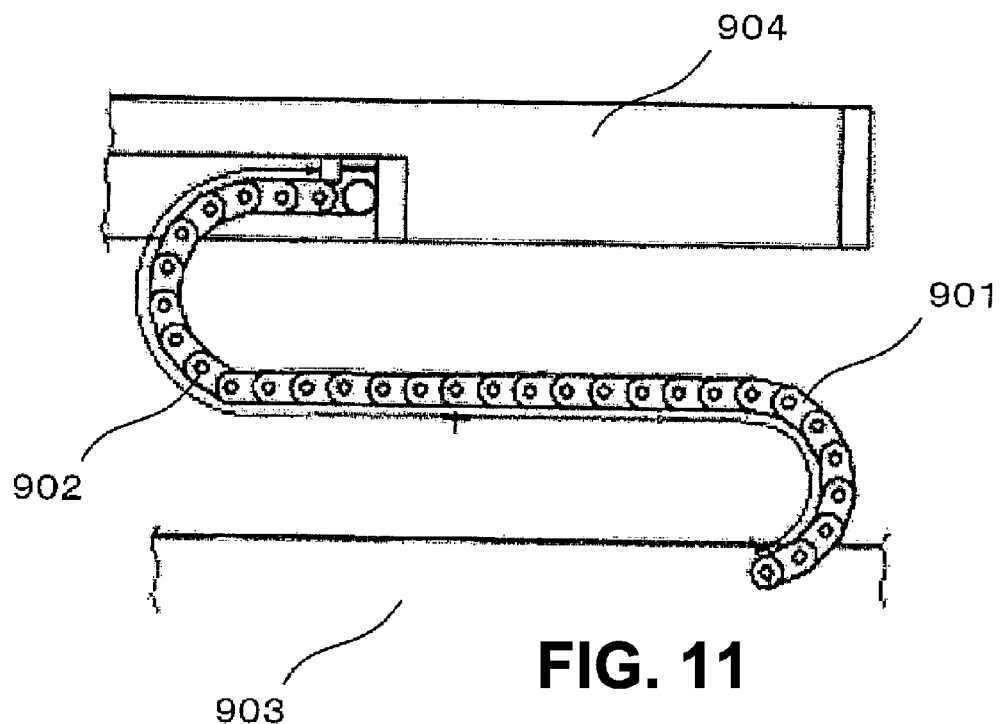
FIG. 11 is a plan view illustrating a conventional power supply apparatus for a sliding door.

FIG. 10 shows a power supply apparatus for a sliding door according to a fifth embodiment of the invention. FIG. 10 is a perspective view illustrating the power supply apparatus 500 of this embodiment. In the power supply apparatus 500 of this embodiment, a flat cable 530 is arranged between a body-side fixture 510 and the door-side fixture 520. In FIG. 10, the left side is the closing direction of the sliding door, and the right side is the opening direction thereof.

FIG. 10 shows the states of the door-side fixture 520 when the sliding door is completely closed (denoted by 520-1), completely open (denoted by 520-3), and at the intermediate position (denoted by 520-2). In addition, the dot line 520a denotes the trace of the door-side fixture 520. In the power supply apparatus 500 of this embodiment, when the sliding door is completely closed, the flat cable 530 is stretched in a straight form (the state 520-1 of the door-side fixture). As the sliding door becomes open gradually from this state, the door-side fixture moves along the trace denoted by the dot line 520a, and the flat cable 530 forms a flexural portion 531 in a direction denoted by the white arrow.

Formation of the flexural portion 531 from the straight form is determined by the pull-out direction of the flat cable 530 from the door-side fixture 520. That is, in this embodiment, the flat cable 530 is configured to be pulled out from the door-side fixture 520 in the direction of the slashed arrow. Accordingly, when the sliding door is open to move the door-side fixture 520 and thus provide an extra length of the flat cable 530, a flexural portion 531 is formed in the same direction (denoted by the white arrow) as in the direction (denoted by the slashed arrow) that the flat cable 530 is pulled out from the door-side fixture 520.

As described above, in this embodiment where the flat cable 530 take a straight form when the sliding door is completely closed, the flexural portion 531 can be formed in the same direction (denoted by the white arrow) as in the direction (denoted by the slashed arrow) of pulling out the flat cable 530.

INDUSTRIAL APPLICABILITY

As described above, according to the present invention, a wiring body for supplying a power to a sliding door employs a flat cable. The flat cable is configured such that it can be pulled out from a body-side fixture and/or a door-side fixture and can be pulled out in at least one direction of front and rear side of the automobile body, thereby forming a flexural portion of the flat cable in the same direction. Therefore, the flat cable can be prevented from touching the automobile body or the sliding door during opening and closing operations of the sliding door.

Although the present invention has been described with reference to several embodiments of the invention, the description is illustrative of the invention and is not to be construed as limiting the invention. Various modifications and variations may occur to those skilled in the art, without departing from the spirit and scope of the invention as defined by the appended claims.

What is claimed is:

1. A power supply apparatus for a sliding door, comprising:
a body-side fixture mounted on an automobile body;
a door-side fixture mounted on the sliding door and having a first curved portion and a second curved portion; and
a flat cable fixed to said body-side fixture and to said door-side fixture and arranged between the first curved portion and the second curved portion,
wherein a pull-out direction of the flat cable from said body-side fixture or said door-side fixture conforms with a protrusion direction of a substantially convex flexural portion that is formed in said flat cable during opening or closing of said sliding door, and
wherein the flat cable is configured to wrap around the first curved portion while the sliding door is in an opened position and to wrap around the second curved portion while the sliding door is in a closed position.

2. The power supply apparatus according to claim 1, wherein a length of said flat cable required for the opening and the closing of said sliding door is bent in the protrusion direction of said convex flexural portion.

3. The power supply apparatus according to claim 2, wherein said flexural portion protrudes approximately parallel to a lengthwise direction of the automobile body.

4. The power supply apparatus according to claim 1, wherein said flexural portion protrudes approximately parallel to a lengthwise direction of the automobile body.

5. The power supply apparatus according to claim 4, wherein a protrusion side of said flexural portion is directed toward a rear side of the automobile body.

6. The power supply apparatus according to claim 4, wherein a protrusion side of said flexural portion is directed toward a front side of the automobile body.

7. The power supply apparatus according to claim 1, wherein said flat cable contains a substantially rectangular conductor.

8. The power supply apparatus according to claim 1, wherein said flat cable is contained in a protection member at least between said body-side fixture and said door-side fixture.

9. The power supply apparatus according to claim 5, wherein said door-side fixture comprises a cable pull-out port, a cable support portion, and a cable turning-up portion, and wherein a pull-out side portion of the cable support portion is substantially flat and substantially parallel to the lengthwise direction of the automobile body.

10. The power supply apparatus according to claim 6, wherein said door-side fixture comprises a cable pull-out port, a cable support portion, and a cable turning-up portion, and wherein a pull-out side portion of the cable support portion is substantially flat and substantially parallel to the lengthwise direction of the automobile body.

11. The power supply apparatus according to claim 5, wherein said door-side fixture includes a cable pull-out port, a cable support portion, and a cable turning-up portion, and wherein a cable pull-out side portion of the cable support portion is inclined toward the automobile body.

12. The power supply apparatus according to claim 6, wherein said door-side fixture includes a cable pull-out port, a cable support portion, and a cable turning-up portion, and wherein a cable pull-out side portion of the cable support portion is inclined toward the automobile body.

13. The power supply apparatus according to claim 5, wherein said door-side fixture includes a cable pull-out port, a cable support portion, and a cable turning-up portion, and wherein, as the sliding door having the door-side fixture mounted thereto moves along a traveling path toward a front side of the automobile body, said flexural portion approaches said door-side fixture while being directed toward the front side of the automobile body, and while the sliding door is substantially at the end of the traveling path, said flexural portion resides substantially at said cable turning-up portion and the flat cable is wrapped around the cable turning-up portion.

14. The power supply apparatus according to claim 6, wherein said door-side fixture includes a cable pull-out port, a cable support portion, and a cable turning-up portion, and wherein, as the sliding door having said door-side fixture mounted thereto moves along a traveling path toward the front side of the automobile body, said flexural portion approaches said door-side fixture while being directed toward the front side of the automobile body, and while the sliding door is substantially at the end of the traveling path, said flexural portion resides substantially at said cable turning-up portion and the flat cable is wrapped around the cable turning-up portion.

15. The power supply apparatus according to claim 5, wherein said door-side fixture includes a cable pull-out port, a cable support portion, and a cable turning-up portion, and wherein, while the sliding door having the door-side fixture mounted thereto is substantially at a rear-most end of a traveling path, the flat cable is substantially straight between said body-side fixture and said door-side fixture and the flat cable contacts with the cable support portion, and, as the sliding door moves toward a front-most end of the traveling path, said flexural portion is gradually formed.

16. The power supply apparatus according to claim 6, wherein said door-side fixture includes a cable pull-out port, a cable support portion, and a cable turning-up portion, and wherein, while the sliding door having the door-side fixture mounted thereto is substantially at a rear-most end of a traveling path, the flat cable is substantially straight between said body-side fixture and said door-side fixture and the flat cable contacts with the cable support portion, and, as the sliding door moves toward a front-most end of the traveling path, said flexural portion is gradually formed.

17. The power supply apparatus according to claim 13, wherein a radius of curvature of said cable turning-up portion is larger than a minimum radius of curvature of the flat cable.

18. The power supply apparatus according to claim 14, wherein a radius of curvature of said cable turning-up portion is larger than a minimum radius of curvature of the flat cable.

19. A power supply apparatus for a sliding door, comprising:
   a body-side structure configured to attach to an automobile body;
   a door-side structure configured to attach to the sliding door and having a first curved portion and a second curved portion; and
   a flat cable coupled to said body-side structure and said door-side structure and arranged between the first curved portion and the second curved portion,
   wherein a substantially convex flexural portion is formed in said flat cable during opening or closing of said sliding door,
   wherein a pull-out direction of the flat cable from at least one of said body-side structure or said door-side structure conforms with a protrusion direction of said flexural portion, and
   wherein the flat cable is configured to wrap around the first curved portion while the sliding door is in an opened position and to wrap around the second curved portion while the sliding door is in a closed position.

20. A power supply apparatus for a sliding door, comprising:
   first means for coupling to an automobile body;
   second means coupling to the sliding door, wherein the second means comprises a first curved portion and a second curved portion; and
   means for supplying power from the automobile body to the sliding door, the means for supplying power connected to said first means and said second means and arranged between the first curved portion and the second curved portion, wherein a pull-out direction of the flat cable from at least one of said first means or said second means conforms with a protrusion direction of an approximately convex flexural portion formed in said means for supplying power during opening and closing of said sliding door, and wherein the means for supplying power is configured to wrap around the first curved portion while the sliding door is in an opened position and to wrap around the second curved portion while the sliding door is in a closed position.

* * * * *